United States Patent [19]

Grube et al.

[11] Patent Number: 5,387,905
[45] Date of Patent: Feb. 7, 1995

[54] MUTLI-SITE GROUP DISPATCH CALL METHOD

[75] Inventors: Gary Grube, Palatine; Richard Comroe, Dundee; Robert Furtaw, Lake Zurich; Mark Shaughnessy, Algonquin, all of Ill.

[73] Assignee: Motorola, Inc., Schaumburg, Ill.

[21] Appl. No.: 956,237

[22] Filed: Oct. 5, 1992

[51] Int. Cl.[6] .............................................. H04Q 1/00
[52] U.S. Cl. ................................. 340/825.52; 370/92; 455/56.1; 340/825.04
[58] Field of Search ...................... 340/825.52, 825.04; 370/92, 85.1; 455/34.1, 34.2, 56.1

[56] References Cited

U.S. PATENT DOCUMENTS

| | | | |
|---|---|---|---|
| 4,716,407 | 12/1987 | Borras et al. | 340/825.04 |
| 5,218,716 | 1/1993 | Comroe et al. | 455/56.1 |
| 5,251,214 | 10/1993 | Mertens et al. | 370/92 |

Primary Examiner—Donald J. Yusko
Assistant Examiner—Gregg V. Miller
Attorney, Agent, or Firm—Timothy W. Markison

[57] ABSTRACT

Processing of dispatch calls in a multi-site communication system begins when a source communication unit initiates a request for a dispatch call. The request is routed to a controller which assigns a controlled device to support the request. In addition, the controller identifies the destination communication units, which site each of the destination units are in, and what controlled devices are needed to support the dispatch call. Having identified the controlled devices, the controller assigns all of the controlled devices needed the same temporary network address. With all the controlled devices having the same temporary network address, the controlled device assigned to support the request can transmit the messages generated by the source communication unit to other controlled devices using the temporary network address. Thus only one representation of a message produced by the source communication unit is transmitted from the assigned controlled device.

8 Claims, 4 Drawing Sheets

MUTLI-SITE GROUP DISPATCH CALL METHOD

TECHNICAL FIELD

This application relates generally to communication systems and in particular to group dispatch call processing.

BACKGROUND OF THE INVENTION

The basic operation and structure of land mobile radio communication systems and cellular radio/telephone communication systems (communication systems) are known. Communication systems typically comprise a plurality of communication units (vehicle mounted or portable radios in a land mobile system and radio/telephones in a cellular system), a predetermined number of repeaters, which are located throughout a geographic region, that transceive information via communication channels, and a controller. Of the communication channels which may be TDM slots, carrier frequencies, a pair of carrier frequencies or other radio frequency (RF) transmission medium, one typically acts as a control channel that transceives operational data between the plurality of communication units and the controller.

A fundamental difference between land mobile communication systems and cellular radio/telephone communication systems is the coverage area of each repeater. In a land mobile communication system, the coverage area of a single repeater may be up to a thirty (30) mile radius, while the coverage area of a repeater in a cellular radio/telephone communication system is typically less than a two (2) mile radius. The relatively large coverage area of a land mobile system allows the land mobile system to readily handle group, or dispatch calls. (A group or dispatch call is one in which one communication channel is allocated to a group of communication units, each of which can communicate to the other units via the allocated channel.) In contrast, the relatively small coverage area of the cellular radio/telephone communication system allows the system to efficiently process private, or point to point, calls. (A private call is one in which a communication channel is allocated to a small number of communication units, typically two, for a private communication.) Although each system processes a particular type of call more efficiently, either system can perform a private call or a dispatch call.

In a land mobile communication system, the plurality of communication units are arranged into communication groups, or talk groups. A communication unit in a particular talk group may initiate a dispatch call by pressing a push-to-talk (PTT) button which informs the controller that a communication channel is needed for this particular talk group. If a communication channel is available, the controller allocates it to the particular talk group and sends out a message on the control channel to the plurality of communication units. The communication units in the particular talk group, after receiving the message, affiliate themselves with the allocated communication channel such that each member of the particular talk group can participate in the dispatch call. The number of communication units in any one dispatch call could range from just a few communication units to a few hundred communication units.

As is also known, a communication system may serve a large population of communication units and comprise a plurality of repeater sites over a large geographic region. During a dispatch call, individual communication units of the particular talk group may be located anywhere in the multi-site coverage area of the system. To efficiently process the dispatch call, the system must be able to set-up the communication paths between the all the sites, or in the sites having a member of the particular talk group located within it, quickly.

A typical prior art multi-site communication system infrastructure comprises, within each repeater at each site, an individual circuit that couples the repeater to the controller or central radio system switching point (central switching point). At each site, at least one repeater is permanently connected to the central switching point. When a dispatch is initiated, the dedicated repeater in each site is automatically connected together such that all members of the talk group could partake in the dispatch call. By having a dedicated repeater at each site for dispatch calls, the set-up of communication paths between each site was relatively fast, however, the overall efficiency of the system is reduced due to the dedication of repeaters to only dispatch calls.

To eliminate the dedication of repeaters to dispatch calls, another typical prior art multi-site communication system incorporates a switching circuit that only links repeaters in sites that have at least one member of the dispatch call located within its coverage area. The linking of repeaters on a call by call basis improves the system's overall efficiency because all of a site's repeaters can be used for any type of call, including dispatch calls. However, set-up times are longer for this type of system as opposed to system having dedicated repeaters since circuit set-up is necessary for each call. Another drawback to this type of system, as well as to the dedicated repeater system, is that both systems require each repeater, via individual circuits, to be linked to the central switching point. Such architectures, which are commonly called single-star architectures, are costly and waste communication links in comparison with distributed tree-structures.

In a distributed tree-structure, paths are only required between repeater sites such that a path exists from any repeater to any other repeater. A distributed switching system eliminates the need for an individual circuit to connect each repeater with the central switching point, however, set-up times for dispatch calls are relatively long due to the multiple switching connections between sites that need to be made.

Distributed switching systems have proven to be relatively efficient at processing point-to-point communications. In such communications, a sending communication unit transmits, via the repeater site that it is located in, a data packet to the destination communication unit. The packet is transmitted from the repeater site of the sending communication unit through the distributed tree-structure to the repeater site of the receiving communication unit. For point-to-multipoint communications, the repeater site of the sending communication unit has to individually transmit the packet to each repeater site that has a receiving communication unit located within it or transmit the packet to all the repeaters simultaneously. In either case, the links that couple the repeater sites together are inefficiently used.

Regardless of the communication system infrastructure (single star or distributed tree), once a dispatch call is established, prioritization of communications is the same. Prioritization is typically based on the type of call (e.g. an emergency call receives a higher priority than a routine check-in call) or the source of the communication (e.g. a console operator has a higher priority than an operator of a communication unit). In many applications, this prioritization scheme is adequate, however, as the size of the communication systems increase, it becomes more apparent that communications within a dispatch call may have little or no interest to a particular operator of a communication unit due to the physical separation of the communicators.

From the above, it is clear that a need exists for a multi-site communication system that provides for fast set-up of point-to-multipoint dispatch call connections between repeaters without requiring a single-star configuration and provides for more individualized prioritization of communications.

BRIEF DESCRIPTION OF THE DRAWINGS

FIG. 6 illustrates a flow diagram for ending a multi-site call in accordance with the present invention.

DETAILED DESCRIPTION OF THE INVENTION

Figure 1:
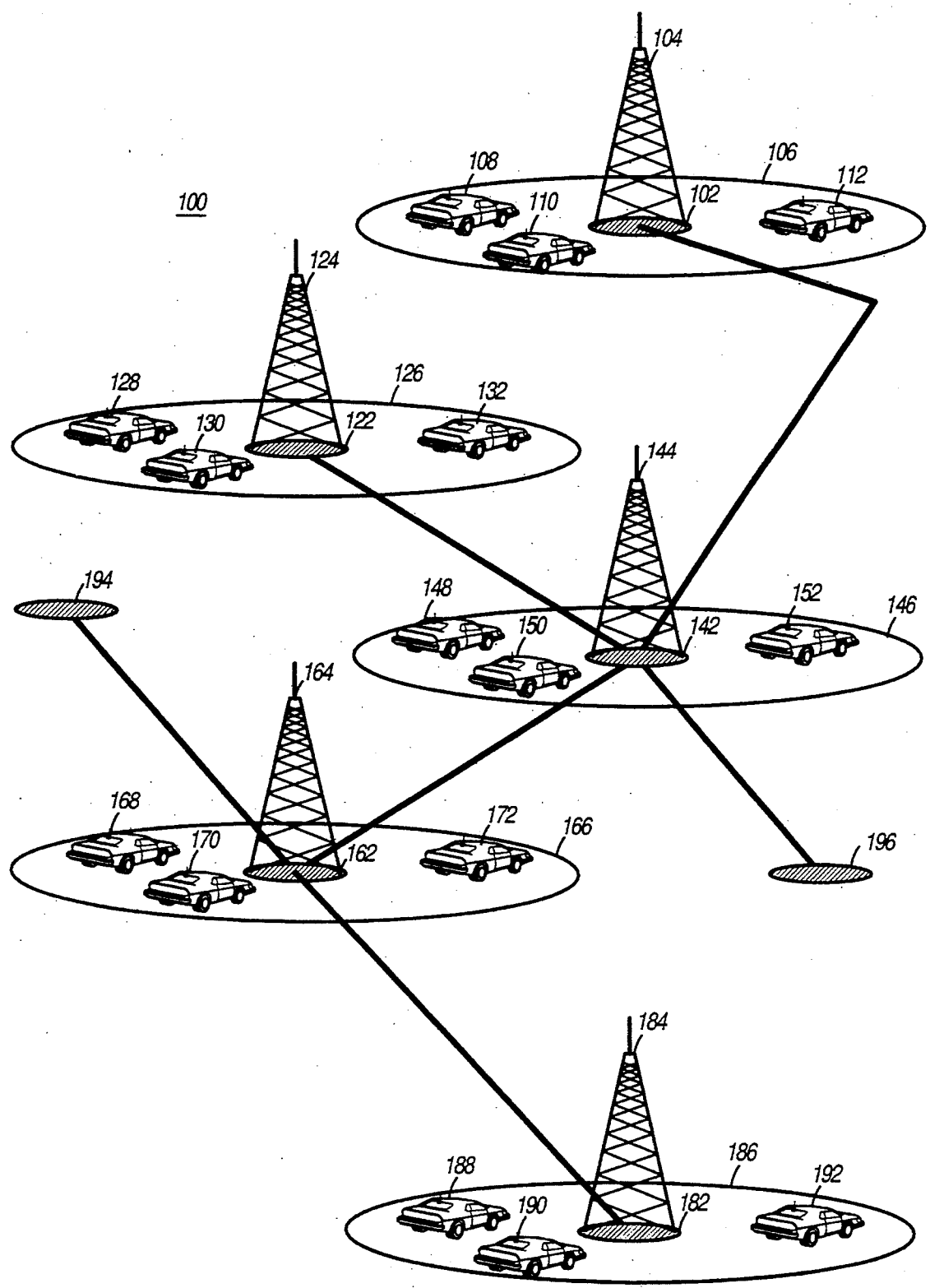
FIG. 1 illustrates a multi-site communication system that may incorporate the present invention.

FIG.1 illustrates a multi-site communication system (100) that comprises a plurality of network nodes (102, 122, 142, 162, 182, 194, & 196), a plurality of vehicle mounted communication units (108, 110, 112, 128, 130, 132, 148, 150, 152, 168, 170, 172, 188, 190, & 192), a predetermined number of repeaters (104, 124, 144, 164, & 184), and a predetermined number of sites having respective coverage areas (106, 126, 146, 166, & 186). The network nodes are linked together in a non-star network, such that every node is connected to every other node, although not necessarily by a direct path. Further, some of the network nodes (102,122,142, 162, & 182) include radio repeaters to provide radio coverage areas, while some of the network nodes (194 & 196) do not. The network nodes without repeaters may be interconnected to consoles at dispatch centers which are not co-located at radio repeater sites, or they may simply be composed of a single call processing controller.

Figure 2:
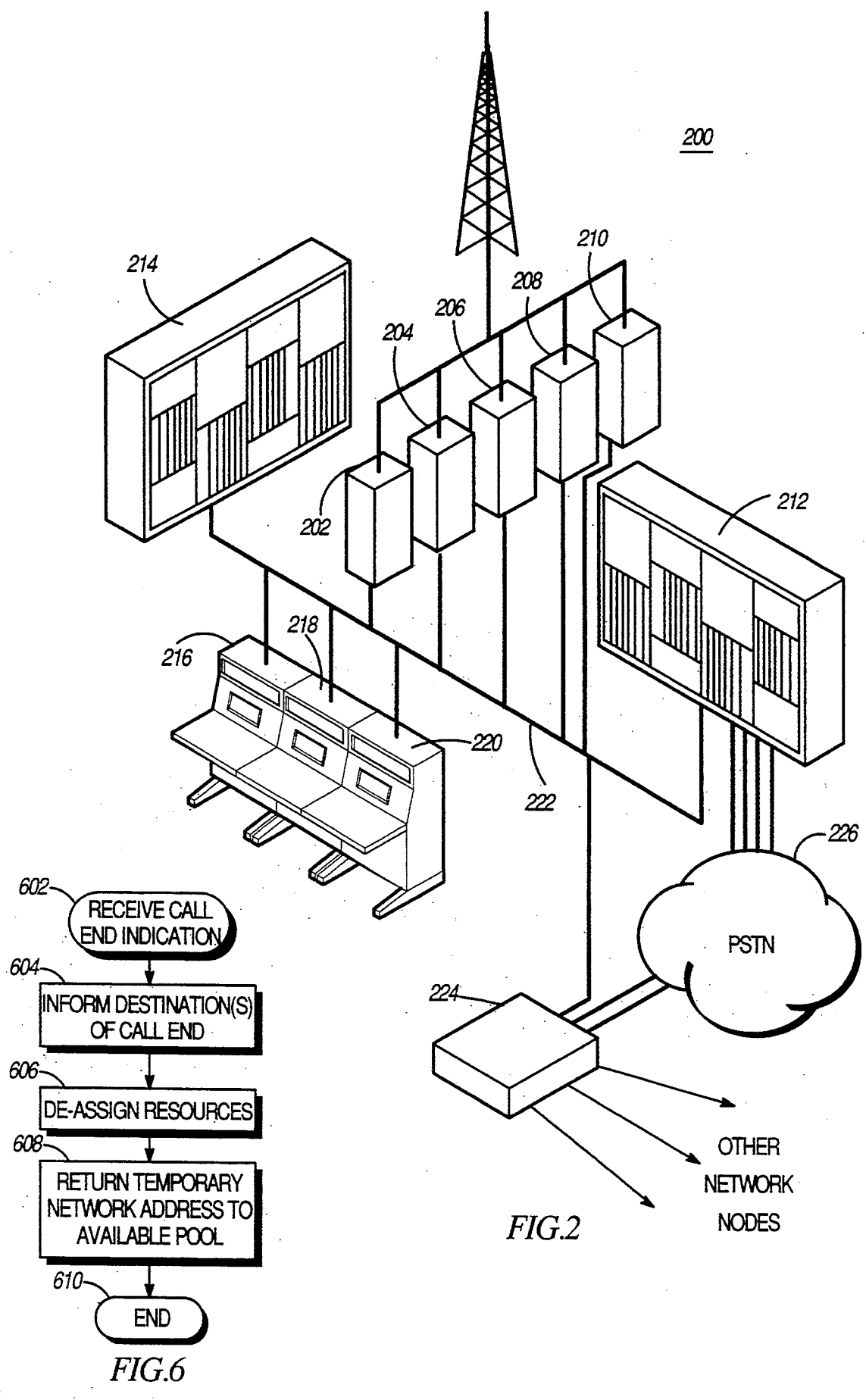
FIG. 2 illustrates a repeater site that may be used in accordance with the present invention.

FIG. 2 illustrates a fully equipped network node (200) comprising a predetermined number of repeaters (202, 204, 206, 208, & 210), a call processing controller (214), a limited number of consoles (216, 218 and 220), a bridge (224), a telephone interconnect terminal (212), and a public switched telephone network (PTSN) (226). Each of these elements am readily known in the art, thus no further discussion will be presented regarding their operation other than to further illustrate the present invention. Note that each radio network or sub-network must at least include one call processing controller at any network node to establish communication between two or more communication units and network users. Further note that there may be multiple call processing controllers at different nodes in the network such that each call processing controller takes responsibility for different sub-networks of the network, where a sub-network is any subset of the total network nodes. Still further note that there is no requirement that a call processing controller be responsible for the site at which it is located. For example, a network consisting of many nodes which are considered to encompass several sub-networks, may have all call processing controllers located at the same node.

The repeaters (202, 204, 206, 208, & 210), the call processing controller (214), the consoles (216, 218, & 220), the bridge (224) and the telephone interconnect terminal (212) are interconnected to a site local area network, or LAN (222). The LAN, which is well known in the art, is used to link all of the devices to each other and to the call processing controller. The LAN carries both control and communication message payloads. The bridging controlled device (224) is only used in networks having more than one network node and is used to interface all communication links between that node and other network nodes. Further, the bridging controlled device (224), like the repeaters, consoles, and the telephone interconnect terminal, is a controlled device as it receives commands from the call processing controller (214).

Each controlled device that is connected to a site LAN, is assigned a unique permanent network address. This address never changes and is used to consistently target control commands to the controlled devices. Each controlled device is also capable of utilizing, on a temporary basis, a temporary network address that is unique when compared to the address space of the permanent addresses. A temporary address may be shared simultaneously by a subset of controlled devices when the subset is chosen to support a communication message. With several controlled devices sharing the same temporary network address, configuration commands can be received quickly such that the source packets may be carried across the network towards the destinations. The temporary storage of a temporary network address is done in existing memory within the controlled device. Note that communication links between network node bridges (224) may be dedicated circuits, or may be switched circuits established between bridges, which is well known in the art.

Figure 3:
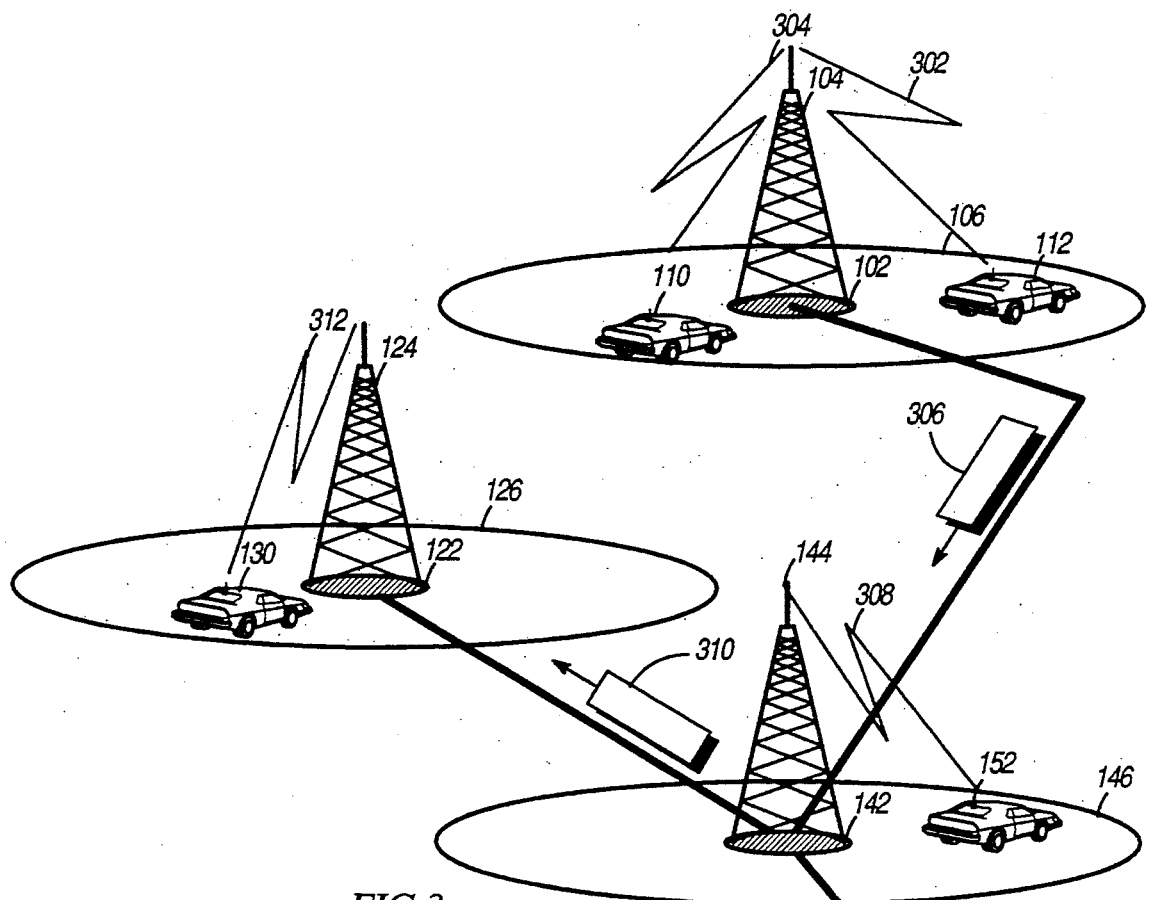
FIG. 3 illustrates the routing of a multi-site dispatch call in accordance with the present invention.

FIG. 3 illustrates the routing of a packet in a point-to-multipoint dispatch call with one active source. Assume that the vehicle mounted communication units 110, 112, 152, & 130 are members of a common dispatch talk-group. The communication unit in vehicle 112 is portrayed as initiating a Push-To-Talk (PTT) transmission. The PTT transmission is responded to by at least one call processing controller which assigns a repeater to receive the PTT transmission. The repeater adds an indicia of priority to the PTT transmission and places, in a digitized format, the combined PTT transmission and the indicia of priority on the site LAN. The indicia of priority is pre-determined and stored within at least one of the call processing controllers. The indicia of priority refers to either the priority of the source (console as opposed to a communication unit), or it refers to the priority of the message type (emergency call as opposed to a status update).

The temporary network address is determined by the call processing controller when the call resources are assigned. The same repeater assigned to receive the source will pull this message off the LAN and transmits it over the air to vehicle 110 since there is only one source and there is no prioritization of sources required. If there were other potential sources, each simultaneously transmitting, then the repeater would sort those messages out and transmit just one or some combination of messages based upon the indicia of priority of each incoming message carrying the same temporary network address.

Since the assumed talk-group contains communication units located in different sites than that of the source communication unit, the communication from the PTT initiator (112) must be digitized, with an appended indicia of priority and associated temporary network address for this call, and placed onto the site LAN as a sequence of packets, by a repeater at node 102. These packets will be transmitted over the inter-node link (306) to node 142. The bridging device (224) at node 102 receives the sequence of packets and retransmits them on the link to node 142 since the packets are associated with a temporary network address that has been assigned at the node 142, or beyond. As shown, there is a talk-group member in the coverage area (146) of node 142, thus the packets will be transferred over the LAN at node 142 to one of that node's repeaters, for broadcast (308) to the communication unit 152. Since the assumed talk-group also contains a communication unit (130) in the coverage area (126) of node 122, the packets (306) received at node 142, are also transferred over another inter-node link (310) to node 122. At node 122 the packets (310) may be transferred over the LAN to one of that node's repeaters, for broadcast (312) to the communication unit 130. Further assume that a dispatch console is at node 196 and is a member of the assumed talk-group such that the packets (306) received at node 142, are transferred over another inter-node link (314) to node 196. At node 196 they may be transferred over the LAN to a dispatch console.

Figure 4:
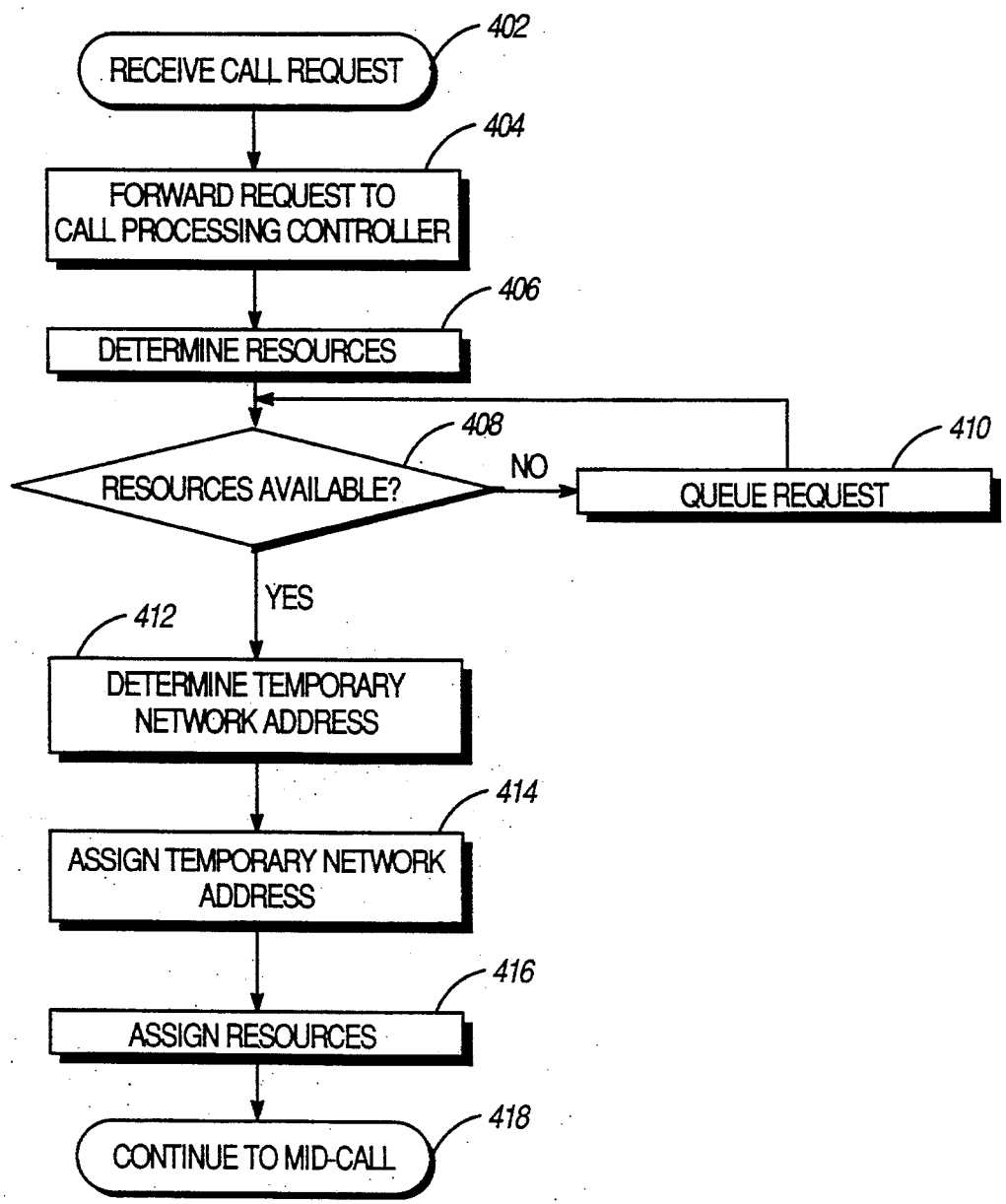
FIG. 4 illustrates a flow diagram for establishing a multi-site call in accordance with the present invention.

FIG. 4 depicts a flow diagram for the call assignment process. The process begins when the system receives a call request (402) from a source communication unit. The source communication unit may be supported by a radio site or from a wireline dispatch position connected to one of the site node LANs. The call request, as known in the art, includes the identity of the source communication unit, the type of call service desired, the identity of the destination communication units, and a message. The request is received by one of the controlled devices of the network and is forwarded (404) to the call processing controller by encapsulating the request into a packet. The packet targets the unique permanent network address of the call processing controller and is carried to the call processing controller by the LAN and bridging network.

The call processing controller determines (406) the required resources for the call. The resources are in part determined by reviewing an internally stored list of target destination communication units and console positions to arrive at where radio and LAN network bridging resources will be required. A check of the resource availability is made (408) to determine if the call can proceed. If not, then the call request is queued (410) so that the resources can be checked again until they are finally available for assignment. For example, from the above discussion regarding the assumed talk-group, the call processing controller determines, by a table look-up of destination positions, that destination communication units (130 and 152) are located in sites having coverage areas 126 and 146. After determining the location of destination units, the controller determines whether a repeater is available in each of the sites. If the repeater is not available in each site, the call is placed in the queue until the repeaters become available. Note that other call processing techniques may incorporated when at least one repeater is not available in a site. For example, the call could proceed in the sites that have a repeater available and add the others sites when a repeater becomes available.

When the required resources are available, the call processing controller determines (412) a usable temporary network address that is unique from all the permanently assigned network addresses and unique from all other temporarily assigned network addresses currently being used. All of the controlled devices required to support this new call are assigned (414) the same additional temporary network address so that they will all respond simultaneously to the message packets being carried from the source(s) to the destination(s). Once the temporary network address has been assigned to the controlled devices, the required controlled devices are assigned (416) to the call. With the controlled devices assigned to the call, the site assigned repeaters transmit a call assignment message to the destination communication unit(s) and the source communication unit begins transmitting its message and the call phase continues to the midcall process (418).

Figure 5:
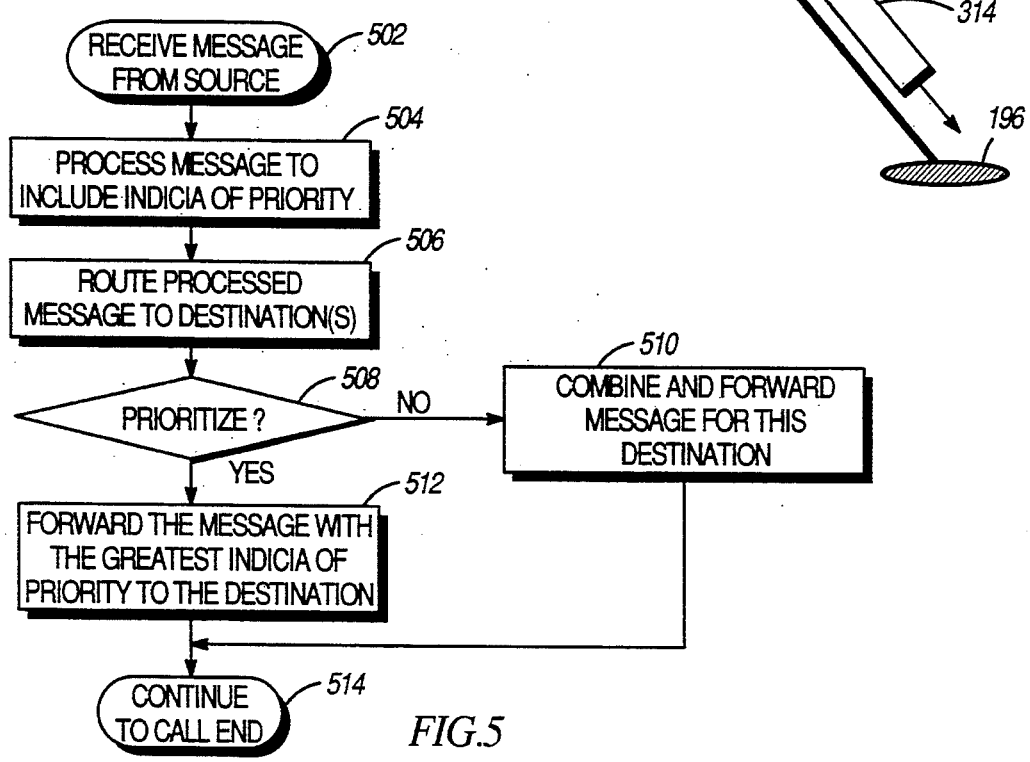
FIG. 5 illustrates a flow diagram for processing a multi-site call in accordance with the present invention.

FIG. 5 illustrates the mid-call process associated with the present invention. The source message is received (502) by the controlled device resource assigned to the source communication unit. The message is digitized and converted into a stream of packets suitable to be placed on a site LAN as is known in the art. The packets are first processed (504) to include the indicia of priority associated with this source unit and message. With the indicia of priority appended, the packets are then routed (506), via the LAN network, to the controlled devices in the sites that have a destination communication unit located within it (target control devices) by sending the packets to the temporary network address assigned to this call.

When the stream of message packets arrives at a target controlled device network resource, such as a repeater serving one or more communication units or perhaps a console position, the controlled device receiving the stream of packets determines whether the stream of message packets contain multiple source message that need to be prioritized (508). In at least one embodiment this determination is predetermined depending on what type of target user the controlled device is serving. For example, if the target is a console position, the dispatcher will typically desire to listen to all possible simultaneous sources for the group call so as not to miss any traffic. In this case the messages are not prioritized (510) as they are combined for presentation to the dispatcher.

Should the target desire prioritization, as is normally the case with field communication units, the potential multitude of incoming messages with the same temporary network address are received by the controlled device, such as the repeater serving the field communication units, and only the message with the greatest indicia of priority is forwarded (512) over-the-air to the communication unit destination from the repeater transmitter. The indicia may represent a message priority or it may represent a source priority. At this point the call will continue until an indication of call end occurs.

FIG. 6 illustrates the call end process of the present invention. A call end indication is received (602) by one of the network controlled devices and forwarded to the call processing controller via its unique permanent network address over the LAN network. The call end is normally received from the last unit transmitting at the conclusion of its transmission. The call processing controller sends a message to all of the network controlled devices, using the temporary network address, that are serving a destination unit to signal (604) the destination units that the call is ending. The call processing controller also sends out a message, using the temporary network address, to all of the assigned resources that they are now de-assigned. They will stop transfering messages for this call and they will stop responding to the temporary network address associated with the call. As the call has now ended, the temporary network address associated with the call is no longer required, so the call processing controller returns (608) this particular address number to the available pool of unused network address ready to use for another call. The process has now ended (610).

From the above, the present invention allows a source message to be carried to multiple destinations to support one-to-many group dispatch with only moving a minimum of traffic on the network. If a common shared temporary network address were not used, the source controlled device would have to send a duplicate copy of the message packets to each destination by using a unique address for each required destination. That would seriously impact the traffic volume carried on the network. Another undesired alternative would be to simply broadcast the message to all LANs across all bridges. That too would create an overload of network traffic.

We claim:

1. In a communication system network having at least one controller, and a plurality of controlled devices for selectively linking communication sources with communication destinations, wherein each of the plurality of controlled devices has a unique permanent network address, and an assignable temporary second network address, a method of supporting a communication from at least a first communication source to at least a first communication destination, the method comprising the steps of:
   A) selecting a set of the plurality of controlled devices to support the communication;
   B) communicating information to the set of the plurality of controlled devices using the unique permanent network addresses, which information includes selection information and an assignment of the assignable temporary second network address, which temporary second network address is different from any of the unique permanent network addresses, and which temporary second network address is utilized by each of the set of the plurality of controlled devices while supporting the communication.

2. The method of claim 1 further comprising the step of:
   C) at the conclusion of the communication, providing to each of the set of the plurality of controlled devices with a message that indicates that the communication has ended and to disregard the temporary second network address.

3. The method of claim 1, wherein a particular one of the set of controlled devices is selected to interface with the first communication source, and upon receiving a message from the first communication source intended for the first communication destination, combining, by the particular one of the set of controlled devices, the message with an indicia of priority.

4. The method of claim 3, wherein the indicia of priority corresponds, at least in part, to communication source priority.

5. The method of claim 3, wherein the indicia of priority corresponds, at least in part, to message priority.

6. The method of claim 3, wherein a different one of the set of the plurality of controlled devices is selected to interface with a second communication source, and wherein the method includes the further steps of:
   C) the first communication source and the second communication source sourcing, in a temporally corresponding manner, a first message and a second message, respectively;
   D) combining, by the particular one of the set of the plurality of controlled devices, the first message from the first communication source with a first indicia of priority to form a first combined message;
   E) combining, by the different one of the set of the plurality of controlled devices, the second message from the second communication source with a second indicia of priority to form a second combined message;
   F) receiving, by another one of the set of the plurality of controlled devices, the first combined message and the second combined message;
   G) determining, by the another one of the set of the plurality of controlled devices, subsequent disposition of the first combined message and the second combined message based, at least in part, on the indicia of priority information contained in the first combined message and the second combined message.

7. In a communication system network having at least one controller, two or more site nodes linked by LAN bridges, and a plurality of controlled devices at each site node for selectively linking communication sources with communication destinations, wherein each of the controlled devices and LAN bridges has a unique permanent network address, and an assignable temporary second network address, a method of supporting a communication from at least a first communication source to at least a first communication destination, comprising the steps of:
   A) selecting a set of the plurality of controlled devices and LAN bridges to support the communication;
   B) communicating information to the set of the plurality of controlled devices and the LAN bridges using the unique permanent network addresses, which information includes selection information and an assignment of the assignable temporary second network address, which temporary second network address is different from any of the unique permanent network addresses, and which temporary second network address is utilized by each of the set of controlled devices and the LAN bridges while supporting the communication.

8. In a communication system network that includes a plurality of communication units, a predetermined number of repeaters that transceive information via a limited number of communication channels, a plurality of sites, a plurality of bridging devices, and a controller, wherein each of the plurality of sites has at least one of the predetermined number of repeaters, wherein each of the repeaters are linked together in a non-star network, wherein each of the plurality of sites has at least one bridging device, and wherein each repeater and each of the bridging devices has a unique permanent network address, and an assignable temporary second network address, a method for a first communication unit located within a first site to communication with a second communication unit located within a second site and a third communication unit located within a third site, the method comprising the steps of:

a) initiating a call request by the first communication unit, wherein the call request includes an identification of the second communication unit and the third communication unit and a request to place a call;
 b) upon receiving the call request, processing, by the at least one repeater in the first site, the call request and forwarding the call request to the controller;
 c) upon receiving the forwarded call request, determining, by the controller, site location of the second communication unit and the third communication unit;
 d) selecting, by the controller, a temporary second network address that is different than any of the unique permanent network addresses;
 e) transmitting the temporary second network address to the at least one repeaters and the bridging device in each of the first site, second site, and third site;
 f) transmitting a packet from the first communication unit to the second communication unit and the third communication unit via the at least one repeater and the bridging device in the first site, wherein the packet includes, at least, a message and the temporary second network address such that only one packet is transmitted via the at least one repeater in the first site and the packet is routed to the at least one repeater and bridging device of each of the second site and third site via the communication system network; and
 g) utilizing the temporary second network address by each of the at least one repeaters and the bridging device in each of the first site, second site, and third site until the communication ends.

* * * * *